United States Patent
Meier et al.

[11] Patent Number: 5,803,804
[45] Date of Patent: Sep. 8, 1998

[54] METHOD AND DEVICE FOR SENSOR-CONTROLLED DEMAND-CONTROLLED VENTILATION

[75] Inventors: Simon Meier, Meilen; Willi Breitenmoser, Uetikon am See, both of Switzerland

[73] Assignee: Staefa Control System AG, Staefa, Switzerland

[21] Appl. No.: 796,929

[22] Filed: Feb. 7, 1997

[30] Foreign Application Priority Data

Feb. 9, 1996 [EP] European Pat. Off. ............. 96101859

[51] Int. Cl.⁶ .................................................. F24F 7/00
[52] U.S. Cl. .................................................. 454/256
[58] Field of Search ........................ 454/256, 239, 454/251, 252, 253, 338

[56] References Cited

U.S. PATENT DOCUMENTS

| | | |
|---|---|---|
| 4,164,172 | 8/1979 | Anderten et al. |
| 4,200,910 | 4/1980 | Hall ................................. 364/104 |
| 4,311,188 | 1/1982 | Kojima et al. ...................... 165/2 |
| 4,499,377 | 2/1985 | Presser ............................ 356/437 |
| 4,771,392 | 9/1988 | Hall ................................. 364/557 |
| 5,084,659 | 1/1992 | Hayashi et al. .................... 318/558 |
| 5,334,248 | 8/1994 | Kwak .............................. 95/12 |
| 5,355,305 | 10/1994 | Seem et al. ..................... 364/161 |
| 5,511,006 | 4/1996 | Tachibana et al. ................ 364/557 |
| 5,520,328 | 5/1996 | Bujak, Jr. ........................ 236/44 A |

FOREIGN PATENT DOCUMENTS

| | | |
|---|---|---|
| 4215459 | 11/1993 | Germany . |
| 8912269 | 12/1989 | WIPO . |

Primary Examiner—Harold Joyce
Assistant Examiner—Derek S. Boles
Attorney, Agent, or Firm—Baker & Botts, L.L.P.

[57] ABSTRACT

Air quality in a interior space is monitored by a sensor and, to determine air renewal demand, the sensor signal is compared with a normal or reference value. For demand controlled ventilation, a switching signal is triggered for changing the amount of outside air supplied when air renewal demand changes. A reference ventilation is performed daily, at a time of day when outside air quality is satisfactory, typically in the early morning hours. Measured quality of the air from the reference ventilation is used in setting or resetting the reference value, e.g. adaptively.

7 Claims, 4 Drawing Sheets

METHOD AND DEVICE FOR SENSOR-CONTROLLED DEMAND-CONTROLLED VENTILATION

BACKGROUND OF THE INVENTION

The invention relates to sensor-controlled demand-controlled ventilation (DCV) of an interior space and, more specifically, to a technique in which air quality is monitored by a sensor, and a sensor signal value is compared with a reference value in deciding as to adjustment of the amount of outside air supplied.

In a method for sensor-controlled demand-controlled ventilation disclosed in German Patent Document DE-A-4215459, an air demand switching signal is triggered when a sensor signal value exceeds a threshold value by a preselected amount or when the threshold value is so exceeded by an electronically obtained average of sensor signal values over a selected time interval. This provides a measure of flexibility in switching, and may be subjectively preferable vis-a-vis a simple comparison between sensor signal and threshold values. Still, this method is not responsive to changing ambient conditions, and energy utilization is far from optimal.

For economical operation of a ventilation or air-conditioning unit, reduction of energy consumption is a primary factor.

SUMMARY OF THE INVENTION

In a preferred method with reduced energy requirements, a desired, nominal or reference value for an air quality is set or reset on the basis of an air quality measurement in a reference ventilation, e.g. at regular time intervals. In resetting, an adaptive adjustment procedure is preferred. In demand-controlled operation of the ventilation or air-conditioning unit, the reference value is used in determining whether and how to adjust the airflow.

In the preferred adaptive procedure, a new reference measurement value is compared with the previously established reference value, and, if the reference measurement value differs from the reference value by a sufficient amount, the reference value is replaced by a new reference value stepped by a selectable amount towards the new reference measurement value.

The method can be implemented in a controller device including a sensor, sensor electronics, and control electronics for demand-controlled and reference ventilation. Preferably, a micro-controller is used for the control electronics.

With preferred periodic reference ventilation, the technique offers adaptability under changing ambient conditions. For example, if reference ventilation is performed daily, in accordance with a preferred embodiment, control is optimized with respect to seasonal variations in ambient conditions in the course of a year, as well as day-to-day variations in the course of a week.

Furthermore, the use of reference ventilation prevents potential sensor instability such as drift from influencing the quality and reliability of the control. Adaptive adjustment of the reference value avoids large one-time changes in the reference value and involves adjustment in small steps in the course of several reference ventilation operations. Thus, extreme changes are not wholly taken into account, which is advantageous for controller stability.

In a preferred embodiment, reference ventilation is carried out once a day, at a time of day when outside air quality is relevant for control purposes, for an optimized relationship between reference value and frequency of ventilation.

DETAILED DESCRIPTION OF PREFERRED EMBODIMENTS

Figure 1:
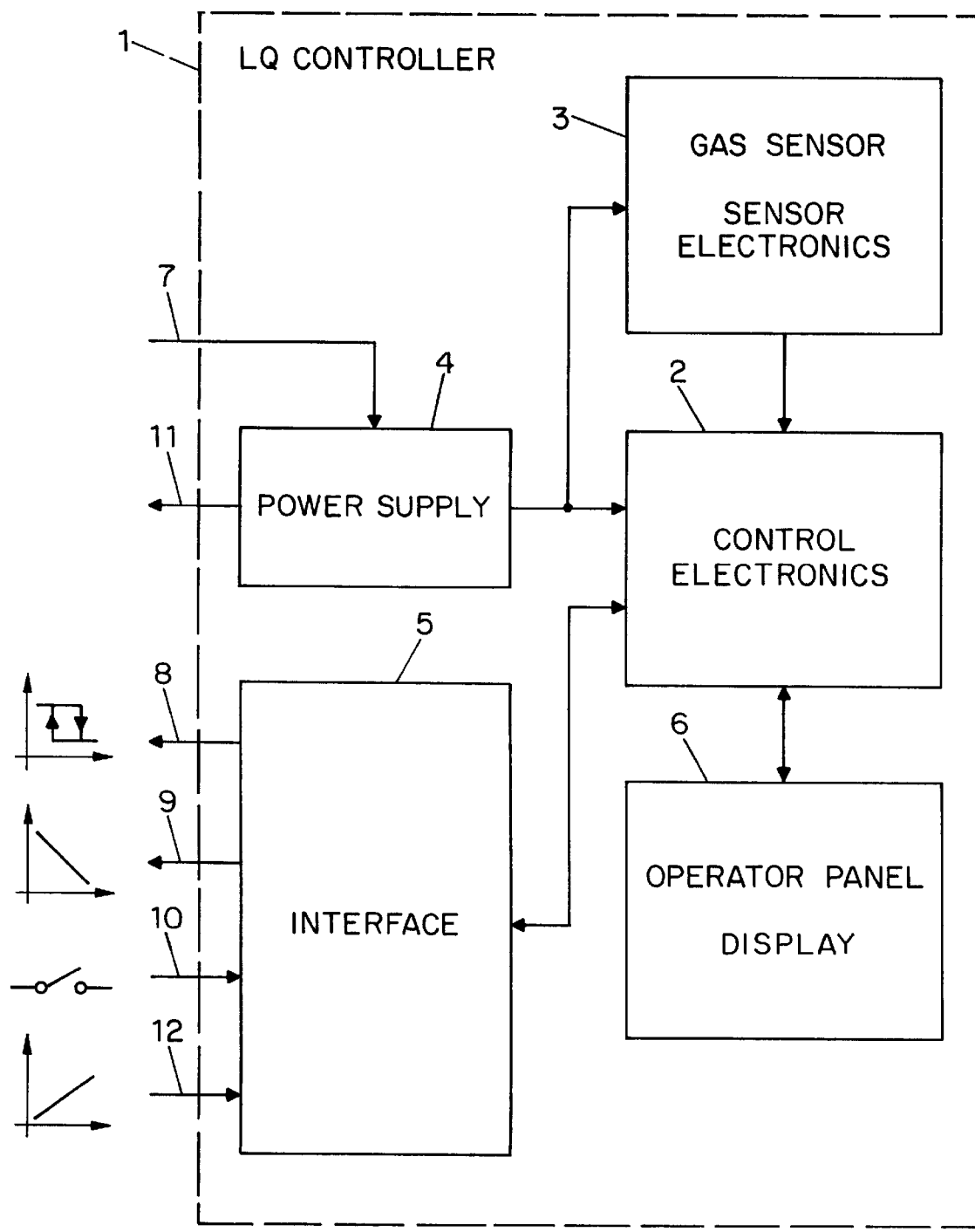
FIG. 1 is a block diagram of a controller according to a preferred embodiment of the invention.

FIG. 1 shows an air-quality controller 1 (LQ controller) for controlling demand-controlled ventilation by a ventilation or air-conditioning unit in which the amount of air supplied is continually adapted to actual air renewal demand. Actual air quality is measured or sensed using a suitable sensor of air quality in an interior space and, by comparing the determined actual air quality value with a reference value, an air renewal demand is determined. A mixed gas sensor can be used, for example, disposed in the interior space for determining the presence of combustible gases and vapors such as body odors, tobacco smoke, and emissions from materials. Such a sensor is particularly applicable, e.g., in restaurants, conference rooms, banquet halls and sports arenas. Suitable also are $CO_2$ sensors, with $CO_2$ concentration being used as an indicator of the presence of people. These are particularly suitable in large smoke-free spaces such as lecture halls, theaters and conference rooms.

The controller 1 includes control electronics 2, a unit 3 with a built-in gas sensor and its sensor electronics, a power supply 4, an interface 5 and a user panel 6 with operating keys and a display. The power supply 4, which is connected to a main power supply via an input 7, supplies the gas sensor/sensor electronics unit 3 and the control electronics 2 with power. The interface 5 is connected to the control electronics 2 and has outputs 8 and 9 for demand signals for switching a fan on and off and/or for controlling its speed (RPM) as a function of the air quality measured by the sensor, and a disable input 10.

The controller 1 with elements 2 to 10 as described is typical where the gas sensor, electronics, operator interface and displays are arranged in a common housing suitably disposed in the interior space to be ventilated. As the gas sensor should be located at a point where good air quality is required, whilst the operator panel should be located for ready access by authorized persons only, the sensor can be placed outside the controller 1 and apart from it. For this case, the controller 1 has a power supply output 11 for the external sensor and an input 12 for its air quality signal.

In both cases, built-in and external, the sensor can be a mixed gas sensor including a highly porous sintered semiconductor tube of doped tin dioxide with an internal heater. The tin dioxide is a catalyst and operates reversibly according to the redox principle. Measurement is broad-band so that, based on the sensor signals, no conclusions can be drawn about the nature of the gases or their concentrations. Still, experience shows that mixed gas sensors are indeed responsive to air quality as relevant to humans. To some extent the sensor signal is cross sensitive to temperature and moisture, so that compensation may be required. In the case of a built-in sensor, compensation can be effected by the sensor electronics in unit 3; in the case of an external sensor, by sensor electronics at the sensor.

The user panel 6 can include keys for inputting parameter values and/or for manual operation, and displays for the operational status and operating mode. The control electronics 2 includes the air quality reference value and makes the comparison between actual and reference values. If the reference value is not met, the fan is switched on (output 8) and/or its speed is adjusted based on the measured air quality (output 9). This can be continuously or in stages, depending on the type of fan used.

Figure 2:
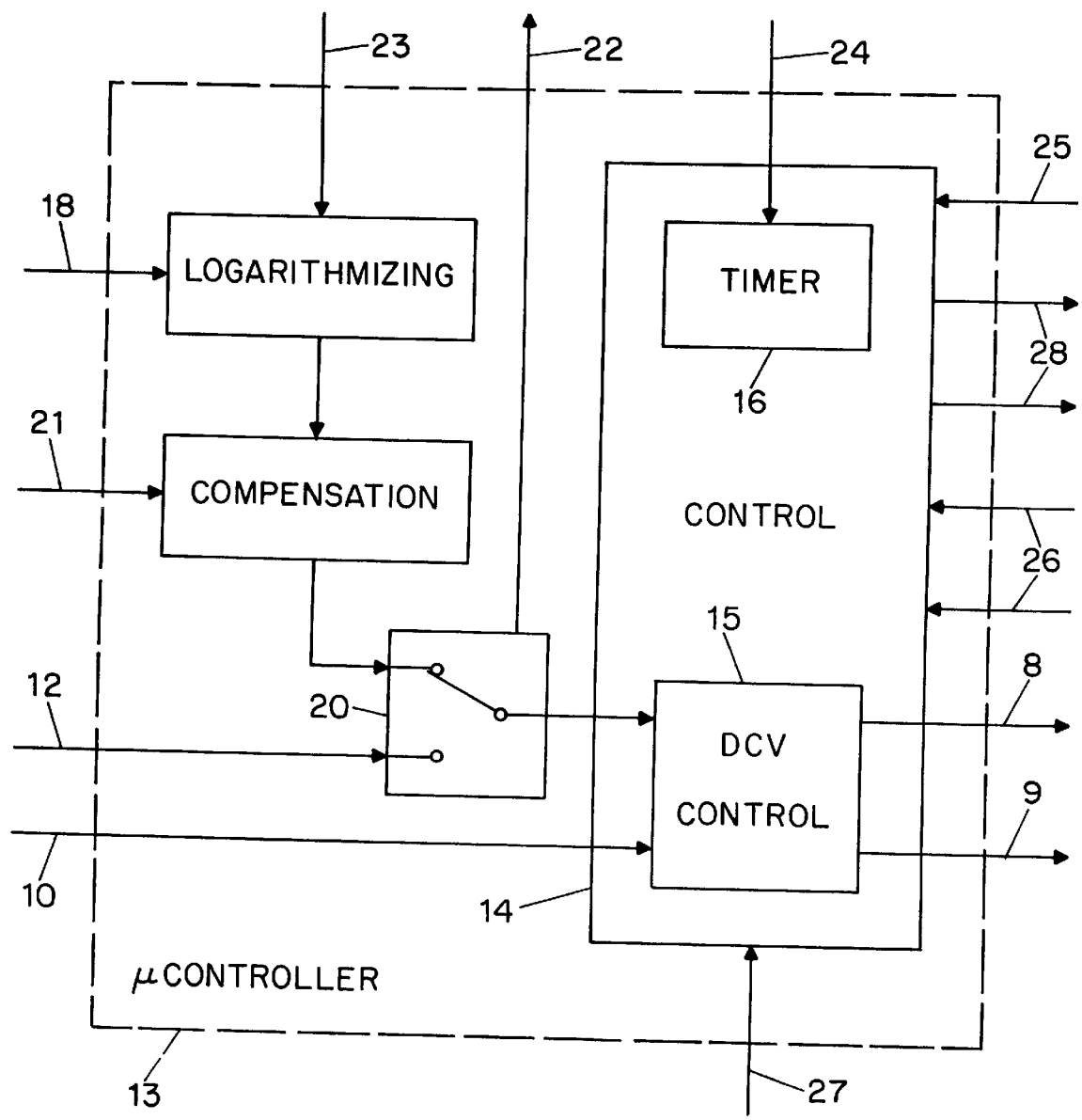
FIG. 2 is a block diagram of a detail of the controller of FIG. 1.

FIG. 2 shows the micro-processor or micro-controller 13 in further detail, including a central controller 14 with DCV controller 15, a timer 16, a logarithm stage 17 to which the signal of the built-in sensor is fed via an input 18, a compensation stage 19 for the signal of the logarithm stage 17, and a signal switch 20. The micro-controller 13 also has an input 21 for a compensation signal to the compensation stage 19, a status output 22 for indicating that an external sensor is connected, an optional input 23 for a signal for calibrating the built-in sensor, an input 24 for a synchronization signal for the timer 16, an input 25 for parameter values, two input keys 26, and an input 27 for setting the cut-in point and the steepness of the demand signals. In essence, the cut-in point is the reference value, and steepness is the slope of the straight-line graph for the relationship between air quality and sensor signal voltage. Shown further are the outputs 8 and 9 for the demand signals, the disable input 10 and the input 12 for the signal of the external sensor as in FIG. 1, and two display outputs 28. The disable input 10 is for blocking the controller 1 with an external signal.

The logarithm stage 17 and the compensation stage 19 are part of the sensor electronics of the built-in sensor and are included in the gas sensor/sensor electronics unit 3 of FIG. 1. The logarithm stage 17 forms the logarithm of the signals of the built-in sensor and its calibration signal and feeds the logarithm signal to the compensation stage 19. The compensated sensor signal produced by the stage 19 is fed to one of the inputs of the signal switch 20. The other input of the signal switch 20 is connected to the controller input 12 (signal of the external sensor) and its output to the DCV controller 15. If no external sensor is connected to the controller 1, the signal switch 20 is in the position shown in the drawing, for feeding the signals of the built-in sensor to the DCV controller 15. But if an external sensor is connected, the signal switch 20 is in the position not shown, in which the DCV controller 15 is connected to the external sensor signal input 12. In this case also, there is a signal "external sensor is connected" at the status or mode output 22, which deactivates the built-in sensor.

Figure 3:
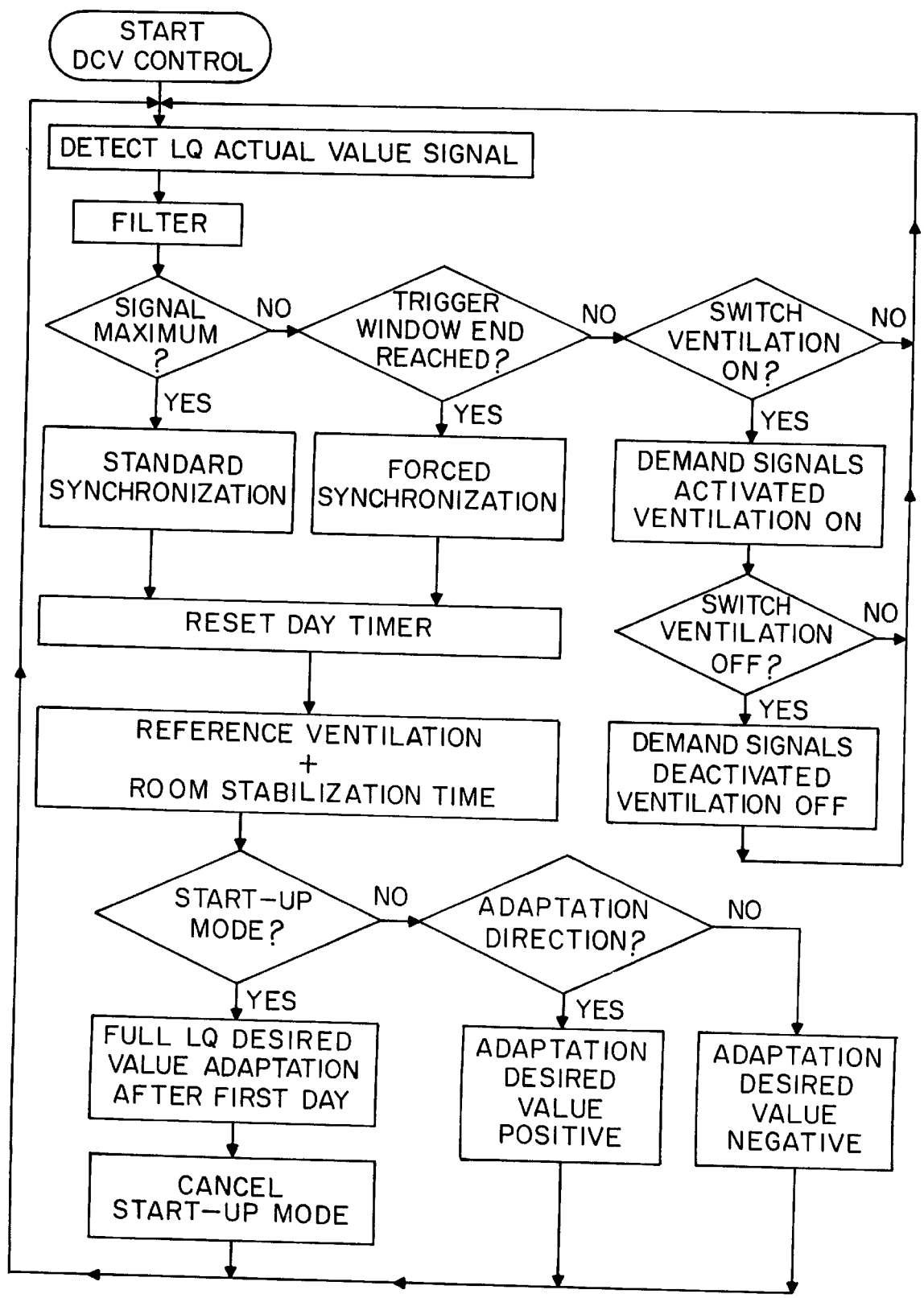
FIG. 3 is a flow diagram of demand-controlled ventilation.

The DCV controller 15, whose flow diagram is shown in FIG. 3, determines the actual value of the air quality and compares it with the reference value, activates and deactivates the demand signals depending on the comparison, and switches the ventilation on or off correspondingly. Also, the DCV controller 15 adjusts the reference value on the basis of periodic reference ventilation, to take changes in outside air quality into account.

Such adjustment is preferred because the air quality in an interior space depends not only on the type and strength of interior odor sources and on the amount of outside air supplied, but also on the quality of the outside air which depends on factors such as time of year, day of the week, traffic, heater setting and the like. If control parameters such as the switching points of the fan remain fixed, the lower the outside air quality the sooner and longer the ventilation unit operates. And if the control parameters are then set to prevent excessive operation under the worst outside conditions, the benefit of good outside air is not fully realized.

To take outside air quality into account, an air replacement or reference ventilation is typically carried out daily in the morning. The air quality is measured with the gas sensor, for the measured value to be used in determining the reference value for the following 24 hours. If the reference ventilation is carried out before the morning traffic sets in, this measured air quality should be optimal for the day. To avoid controller instability due to extreme changes in the reference value, adaptive updating of the reference value is preferred. For this purpose a newly obtained reference measurement value is compared with the reference value of the previous day. If the new value is greater, a new reference value is set by incrementing the old reference value by a suitable amount and vice-versa.

The timing of the reference ventilation is controlled by the timer 16, based on an external time-of-day signal at the input 24 or an internal clock signal in the micro-controller 13. The latter is advantageous in that no external clock is required, nor a battery for its operation. Internal timer synchronization can be based on the observation that sensor signal values over periods of several days, for example, clearly show a periodic form indicating times of least air pollution, e.g. in the early morning hours.

These times can be determined in the microcontroller 13 by filtering the sensor signal and examining the filtered signal for maxima. As maxima correspond to times of least air pollution or best air quality, they can be used to synchronize the timer 16. When the timer 16 receives such a synchronization signal it starts counting from zero to 25.5 hours, for example, and the micro-controller 13 seeks for the air quality maximum between 22.5 and 25.5 hours. If a maximum is found in this time window, a reference ventilation is started and the timer is reset for a new count.

DCV control operation is illustrated by the flow diagram of FIG. 3. The gas sensor, which can be included in the controller 1 or placed external thereto, continuously measures the air quality. The measurement signal is filtered, and the filtered signal is examined for a signal maximum within the trigger window of 22.5 to 25.5 hours. If a maximum is found, the timer 16 (FIG. 2) is restarted at zero. If no maximum is found, synchronization is forced, with the timer restarted at zero at the end of the trigger window (at 25.5 hours). After a suitable stabilization time of the interior space after the reference ventilation, air quality is measured and its value is used in setting the reference value for the following 24 hours.

At initial or renewed start-up (see also FIG. 4), the reference value is set by adopting the measured air quality value, and start-up mode is canceled. In subsequent operation, the measured air quality value is compared with the reference value set previously, and a new reference value is determined adaptively as described above.

DCV control operation subsequent to the signal filtering step applies to the special case of the reference ventilation, once a day. In normal operation, the filtered signal will not have a maximum, nor will the end of the trigger window have been reached, so that control will pass through the loop shown on the right-hand side in FIG. 3. On the basis of a comparison between the actual value of the air quality sensor signal and the reference value, a decision is made as to whether ventilation should be turned on or not.

In the former case, the demand signals are activated and ventilation is turned on. During ventilation, air quality sensor values are compared with the reference vale. When air quality has become satisfactory, the demand signals are deactivated and the ventilation is turned off.

Figure 4:
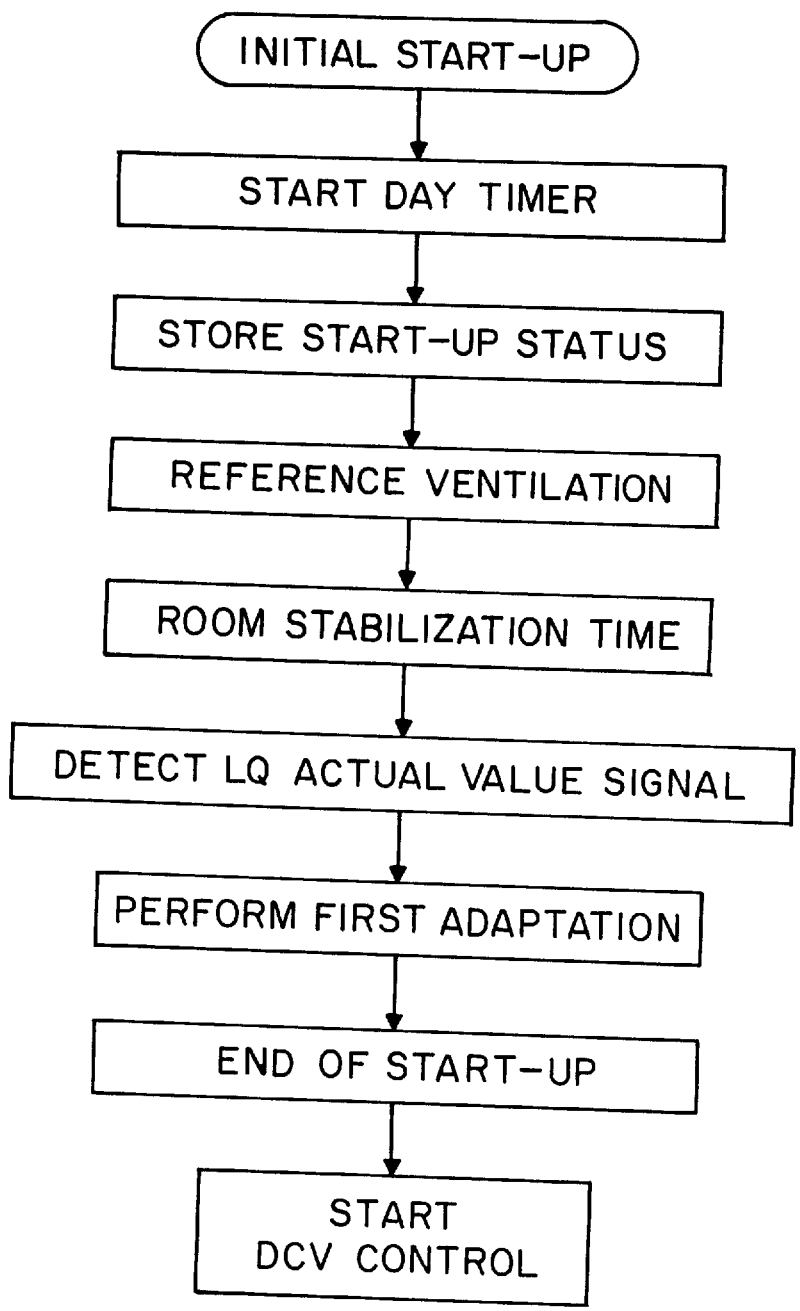
FIG. 4 is a flow diagram of controller start-up.

The flow diagram of FIG. 4 illustrates initial start-up of the micro-controller 13 (FIG. 2), as referred to above in the description of FIG. 3. This applies after installation or after an operational interruption of the controller 1 (FIG. 1). The timer 16 (FIG. 2) is started, mode or status is set to "start-up", a reference ventilation is carried out and, after a suitable stabilization period, air quality is measured in the interior space. The air quality sensor value is adopted as the initial reference value. Control then passes to the procedure of FIG. 3.

We claim:

1. A method of ventilating an interior space, comprising:

reference ventilating the interior space with outside air and obtaining a sensor measurement value for an air quality in the interior space, and using the sensor measurement value in determining a reference value; and repeatedly obtaining a further sensor measurement value for the air quality in the interior space, comparing the obtained further sensor measurement value with the reference value and, depending on by how much the obtained further sensor measurement value differs from the reference value, adjusting an air flow magnitude, of an air flow from outside into the interior space, wherein the reference ventilating is effected at a time of day when the outside air has a quality which is relevant in determining how to adjust the air flow magnitude.

2. The method according to claim 1, wherein determining the reference value comprises:

comparing a proposed new reference value with a previously determined reference value and increasing or decreasing the previously determined reference value by a preselected amount, depending on whether the proposed new reference value respectively is greater or less than the previously determined reference value.

3. The method according to claim 1, effected daily.

4. The method according to claim 1, further comprising:

examining a plurality of sensor measurement values for periodically recurring maxima, effecting a further ventilating at a time at which one of the maxima occurs, and using the time at which one of the maxima occurs in synchronizing a control clock.

5. The method according to claim 1, further comprising:

filtering a plurality of measurement values in a preselected time interval, determining whether the filtered measurement values have a maximum in the time interval and, if so, using the maximum in determining the reference value.

6. The method according to claim 4, wherein the preselected time interval includes a time 24 hours after determining the reference value, and if no maximum is determined in the time interval, further comprising effecting a further ventilating.

7. The method according to claim 6, wherein the preselected time interval lies between 22.5 and 25.5 hours after determining the reference value.

\* \* \* \* \*